United States Patent [19]

Hunter et al.

[11] Patent Number: 5,111,062

[45] Date of Patent: May 5, 1992

[54] METHOD AND APPARATUS FOR REDUCING PIXEL CLOCK JITTER IN A LASER SCANNER

[75] Inventors: Timothy M. Hunter, Webster, N.Y.; Hung M. Pham, San Gabriel, Calif.; John L. Zanghi, Rochester, N.Y.

[73] Assignee: Xerox Corporation, Stamford, Conn.

[21] Appl. No.: 751,391

[22] Filed: Aug. 28, 1991

[51] Int. Cl.⁵ .............................................. H03K 3/00
[52] U.S. Cl. ...................................... 307/269; 358/471; 358/474
[58] Field of Search ...................... 307/260, 269, 272.1, 307/272.3; 358/209, 443, 445, 471, 474, 481, 494, 497; 346/108, 150, 160

[56] References Cited

U.S. PATENT DOCUMENTS

| | | | |
|---|---|---|---|
| 4,204,233 | 5/1980 | Swager | 358/481 |
| 4,349,847 | 9/1982 | Traino | 358/497 |
| 4,571,623 | 2/1986 | Schoon | 358/208 |
| 4,587,531 | 5/1986 | Dangler | 346/108 |
| 4,635,000 | 1/1987 | Swanberg | 331/10 |
| 4,677,292 | 6/1987 | Shimada | 250/235 |

Primary Examiner—Robert J. Pascal
Attorney, Agent, or Firm—Oliff & Berridge

[57] ABSTRACT

An apparatus and method of reducing pixel clock jitter in a raster scanner having a oscillator which generates a pixel clock signal and a start of scan sensor for generating a start of scan signal, includes the generation of an inverted pixel clock signal and an inverted start of scan signal. Based on which of the pixel clock signal or the inverted pixel clock signal has a rising edge closer to the start of scan signal, one of the pixel clock or inverted pixel clock signal is selected to replace the original pixel clock signal. Further selections are prevented from occurring until a subsequent start of scan signal is detected.

6 Claims, 3 Drawing Sheets

METHOD AND APPARATUS FOR REDUCING PIXEL CLOCK JITTER IN A LASER SCANNER

BACKGROUND OF THE INVENTION

1. Field of the Invention

The present invention relates to a pixel clock jitter reduction system and method for using same in a laser scanner. More particularly, the invention relates to a pixel clock jitter reduction system which uses a pixel clock signal and a start of scan signal to generate a new pixel clock and minimize pixel placement errors.

2. Description of the Related Art

The minimization of pixel placement errors in a raster scanner often poses difficult problems. Several factors which contribute to pixel placement errors are polygon motor speed fluctuations, optical anomalies, and pixel clock jitter. Prior systems have attempted to correct the polygon motor's speed fluctuations or the optical anomalies which are difficult to do.

A laser scanner, such as a raster output scanner is used to transmit image information to an imaging surface such as a recording medium. A light source, such as a laser light source, generates a light beam which is modulated in accordance with image information contained in video image signals or pixels. The modulated light beam is applied to a rotating, multi-faceted polygon which scans the modulated light beam across the image plane of the imaging surface. Each facet of the polygon is mirrored. The polygon is spun by a motor, the motor speed controlling image resolution in the direction of movement of the imaging surface (i.e., the Y-direction). Image resolution within a scan line (i.e., the X-direction) is a function of the image signal or pixel rate. The resolution in the direction of scan is determined by the image signal or pixel clock frequency. Each mirrored facet of the polygon provides image information corresponding to one horizontal scan line.

A number of systems which correct errors within the raster scanner are disclosed. U.S. Pat. No. 4,204,233 to Swager, assigned to Xerox Corporation, discloses a system for correcting a facet error which changes the rate of a bit clock based on errors of individual facets of a rotating polygon. At the time of a start-of-scan signal, a bit clock counter is reset. The error for a particular facet is determined by the interval between a scan line bit count output and an end-of-scan output. The facet error is represented by a binary number corresponding to the interval. The error for a particular facet is stored in a memory location corresponding to that facet. When the facet is utilized, the error previously stored in the memory location for that facet is used to control an oscillator so that the output frequency corresponds to the frequency required to compensate for velocity errors caused by that facet. After the facet is scanned, the error signal previously stored in memory for that facet is updated. During the time between the end-of-scan signal and the start-of-scan signal for a scan line, the error for the next facet is read out of memory. Because the pixel clock is itself used to measure the error, the reference allows only an accuracy to within plus or minus one pixel clock per scan line. Thus, if used in conjunction with a typical pixel clock which runs at up to a maximum of 100 MHz, the accuracy to which error correction can be achieved equates to only plus or minus 10 nanoseconds correction per scan line.

U.S. Pat. No. 4,349,847 to Traino, assigned to Xerox Corporation, discloses a raster output scanner having a movable imaging member and imaging beam for exposing the imaging member to create images thereon. A rotating polygon scans the beam across the imaging member in line-by-line fashion while the beam is modulated in accordance with pixels input thereto. A clock provides clock pulses for clocking the image pixels to the modulator. The polygon's velocity is controlled to maintain a predetermined velocity relationship between the imaging member and the polygon. Accordingly, the device compensates only for velocity variations.

U.S. Pat. No. 4,677,292 to Shimada discloses a method of generating image scanning clock signals in an optical scanning device wherein a plurality of clock signals are generated by a number of delay elements. One of the plurality of clock signals is selected based on the output of a light sensor. When the light sensor signal is detected, a latch circuit outputs a plurality of clock signals and a plurality of inverted clock signals. These inverted and non-inverted clock signals are fed to a clock selector circuit.

U.S. Pat. No. 4,571,623 to Schoon discloses a data clocking circuit wherein data clock signals are selected from an output of a stable clock in accordance with a program stored in a memory. A voltage controlled oscillator (VCO) provides the data clock signals and the VCO is controlled based on the difference in the accumulated count between the selected clock signals and the data clock signals. A lower frequency clock is used in conjunction with a simulated phase locked loop to simulate a higher frequency clock. A technique for smoothing out a data clock signal is provided.

U.S. Pat. No. 4,587,531 to Dangler discloses a clock signal producing apparatus wherein a start of scan (SOS) sensor and an end of scan (EOS) sensor are used to generate a clock signal. The signals from the SOS and EOS sensor are fed into the S and C inputs of an SR flipflop. The output of the SR flip-flop is fed into a NOR logic gate. The other input of the NOR gate in connected to a feedback loop. The output of the NOR gate is put through a delay. The output of the delay is fed back to the NOR gate and is also output as the clock signal.

U.S. Pat. No. 4,635,000 to Swanberg, assigned to Xerox Corporation, discloses a temporal pixel clock synchronization system with jitter correction wherein a timing error signal is generated based on the phase error between a start of scan signal and a start of pixel count signal and between an end of scan signal and an end of pixel count signal. There is also a facet error correction circuit.

While the related art attempts to compensate for various errors affecting pixel registration, the art does not compensate for pixel clock jitter errors by using the pixel clock signal and the start of scan signal to generate a new jitter-free pixel clock signal.

SUMMARY OF THE INVENTION

It is therefore an object of the present invention to provide a pixel clock jitter reduction system which effectively doubles the pixel clock frequency without using an expensive high frequency oscillator.

It is another object of the present invention to provide a pixel clock jitter reduction system wherein a pixel clock signal and a start of scan signal are used to generate a new more accurate pixel clock signal.

The present invention provides a reduced jitter pixel clock signal by selecting between a pixel clock signal and an inverted pixel clock signal based on which signal's rising edge is closest to the beginning of the start of scan signal to generate a new pixel clock signal, which is more accurate.

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENTS

Figure 1:
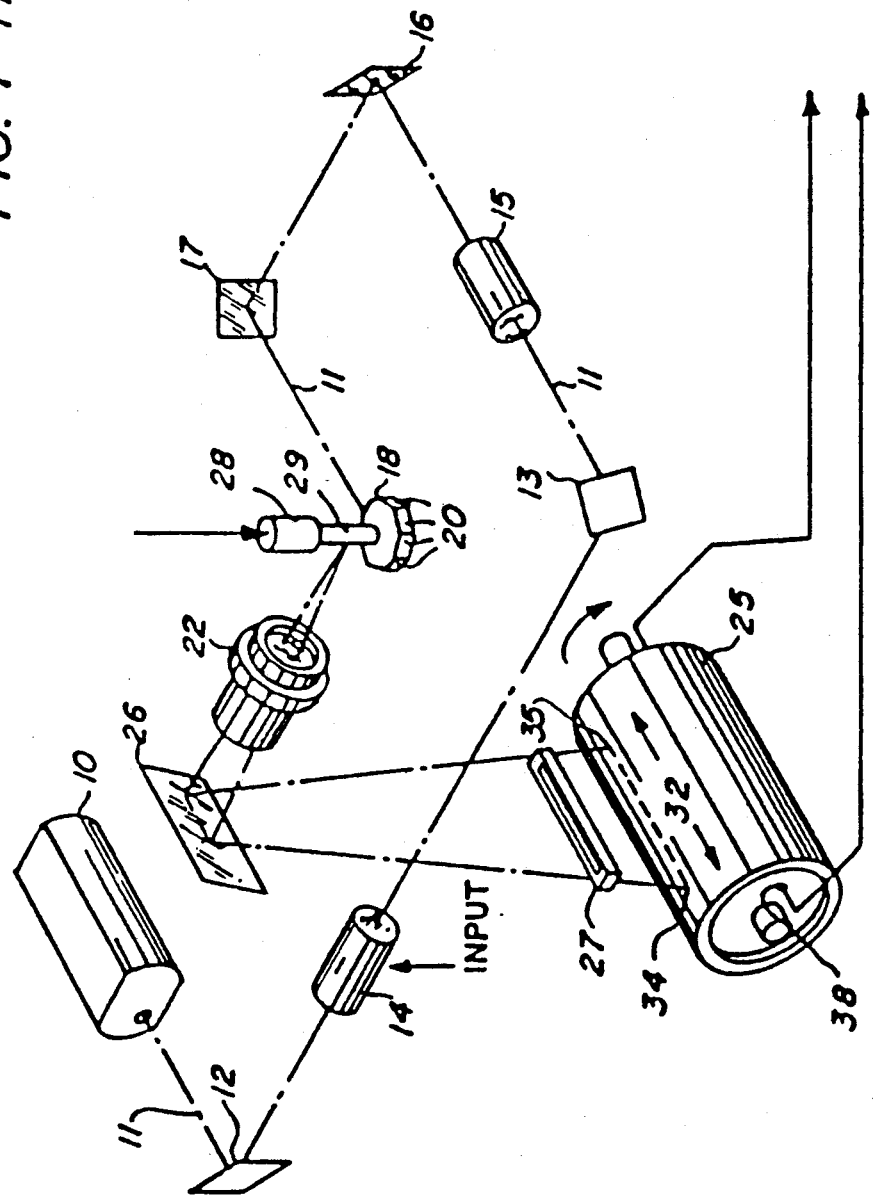
FIG. 1 is a isometric view of a raster scanner in which the present invention might be used.

Now, with reference to FIGS. 1 and 2, a raster scanner which may use the present invention will be described. There is shown an exemplary scanning system which the present invention is adapted for use. An illumination source, which in the exemplary arrangement shown comprises a laser 10 for generating a collimated beam 11 of monochromatic radiation for modulation by modulator 14 in conformance with the information contained in an electrical signal is provided. Beam 11 is reflected by mirror 12 to modulator 14.

Modulator 14 may be any suitable electro-optic modulator for imparting video information to beam 11. The modulator 14 may be for example, a Pockel's Cell comprising a potassium dyhydrogen phosphate crystal, whose index of refraction is periodically varied by the application of the varying voltage which represents the electrical signal. The signal may contain information either by means of binary pulse code modulation or wide beam frequency code modulation.

The beam 11 is reflected from mirror 13 to an astigmatic lens configuration 15. Lens 15 focusses the beam 11 to a controlled energy distribution which is reflected from mirrors 16 and 17 to impinge upon at least one facet of a scanning polygon mirror 18.

The rotational axis of the polygon 18 is orthogonal to the plane in which light beam 11 travels. The facets 20 of polygon 18 are mirrored surfaces suitable for reflection of any radiated beam impinging upon them. Alternatively, flying spot scanners could be provided by any other suitable device such as mirrored piezoelectric crystals or planar reflecting mirrors which are driven in a oscillatory manner.

A lens 22 is located in the optical path between the polygon 18 and the imaging medium which in the exemplary arrangement shown comprises a photoconductive drum 5 of a xerographic reproduction or copying system (not shown). The lens 22 is of a diameter to focus the light beam reflected from facets 20 of polygon 18 to a spot in a focal point approximate the surface of the drum 25 via mirror 26. While a drum 25 is illustrated in the preferred embodiment, the invention is also applicable to systems employing a photoconductive belt. The following description will refer to a drum 25, but it is recognized that a belt may replace the drum.

Lens 22 provides a linear relationship between the rotating polygon 18 and the deflection of the spot in the transverse direction at the recording medium 25. This linearization by optical means prevents barrel and pin cushion-type distortion of facts without the need for electrical compensation.

Polygon 18 is continuously driven preferably by a stable DC servo controlled motor 28 through drive shaft 29 which is rotation synchronized with a clock signal representative of the desired scanning rate. In the arrangement illustrated, it will be understood that the rate of rotation of the drum 25 determines the space in between successive scan lines. Preferably, cylindrical lens 27 is interposed between mirror 26 and drum 25 to compensate for any misalignment of the optical elements.

As the polygon 18 rotates, light beam 11 traces a scan line 32 on the surface of recording medium 25 from point 34 (Start Of Scan or SOS, herein) to point 35 (End Of Scan or EOS, herein). Photodetectors 38 and 39 are provided under a transparent portion of the surface of the drum 25. The detectors 38 and 39 generate a signal each time light beam 11 reaches points 34 and 35 to provide a SOS and EOS signal. As will be understood, the width of the SOS-EOS pulse train is dependent upon the velocity at which the polygon 18 rotates. Variations in polygon velocity, due for example, to the hunting characteristics of the motor 28, is reflected by a change in the width of the pulse generated by detectors 38 and 39. As alluded to heretofore, the imaging member may comprise a xerographic drum 25. As will be understood by those skilled in the art, drum 25 rotates consecutively through the charging station whereat a uniform electrostatic charge is applied, and an exposure station wherein image beam 11 derived from rotating polygon 18 scans across the drum 25 selectively to charge the drum 25 in accordance with the video signal pattern input modulator 14. The latent electrostatic image formed on the drum 25 next passes through a developing station whereat the image is rendered visible by the application of toner. Following development, the image is carried on drum 25 onto a transfer station where the developed image is electrostatically transferred to a copy substrate material, typically a sheet of paper. A fusing device fixes the transferred image on a copy sheet.

Modulator 14 serves to modulate and vary the intensity of the light beam 11 respective to the position of the beam 11 within the scan line 32 in accordance with the video signal input. As the spot formed by beam 11 traverses the charge surface of drum 25 through a given scan angle, the spot dissipates electrostatic charge in accordance with its light intensity. The electrostatic charge pattern thus produced is developed in a developing station and transferred to a final copy paper as described. The transfer drum 25 is cleaned by a cleaning device which is a rotating brush. The aforedescribed cycle is repeated for subsequent and additional copies.

Video information in the form digital signals may be provided through an 8-bit data bus 45 from a suitable source (not shown). In the example shown, data from the bus 45 is input to a parallel in-serial out shift register 46, the serial output of shift register 46 being coupled to modulator 14 through lead 47. The shift register is driven by clock pulses from the pixel clock 49. The SOS and EOS signals generated by detectors 38, 39 respectively are input to pixel clock 49 through leads 50, 51, flip flop 62 and lead 63.

The pixel clock 49 includes a voltage controlled oscillator (VCO) 55, a divide-by-N counter 57, a filter 66 and a phase detector 61. These components simulate a phase locked loop which locks the phase of the pixel clock to the phase of he LINE SYNC signal on line 63. The present invention would be used with a free running crystal oscillator as the pixel clock 49 and does not have to be phase locked to the signal of line 63. Thus, the circuit of FIG. 3 would be connected to line 52 before it enters the shift register 46 which is the pixel clock signal. The output of the circuit of FIG. 3, PCOUT, would be fed into the shift register 46 as the corrected pixel clock which is used to control the shift register 46.

Figure 2:
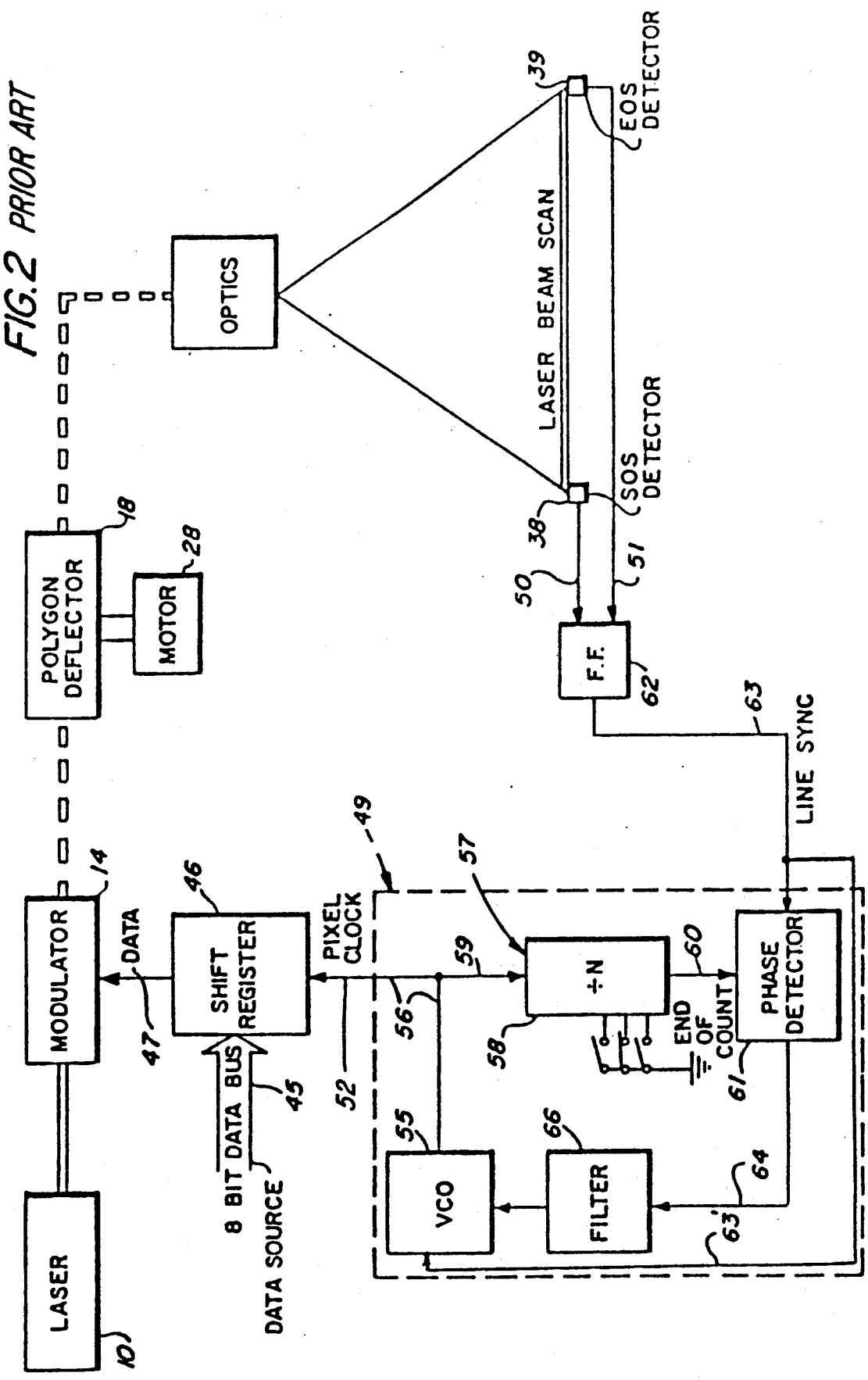
FIG. 2 is a block diagram of raster scanner and a conventional pixel clock generation circuit.

The two systems shown in FIGS. 1 and 2 may suffer from pixel clock jitter which can be corrected by using a higher frequency oscillator which would be very expensive. On the other hand, the present invention will effectively double the pixel clock frequency without the added expense. The pixel clock jitter reduction system of the present invention will now be described with reference to FIGS. 3 and 4. The circuit generally operates by utilizing both a pixel clock signal line 100 and an inverted pixel clock signal line 105. The circuit basically clocks a reference start of scan signal line 110 with both the pixel clock signal and the inverted pixel clock signal. The signal (PC or PCINV) which is closest to the rising fixed reference point edge of the start of scan signal will select the opposite clock to be used as the pixel clock signal for the next scanline. The circuit effectively locks the start of scan signal and the pixel clock or inverted pixel clock signal to each other within half of a clock period. Effectively, the circuit doubles the clock frequency very cheaply and eliminates the need for a very expensive high frequency crystal oscillator. The conventional raster scanner of FIG. 1 operates at a root pixel clock frequency, PC, of 87.905305 MHz. This same scanner including the circuit of the present invention will operate at an effective pixel clock frequency of 175.81 MHz.

Figure 3:
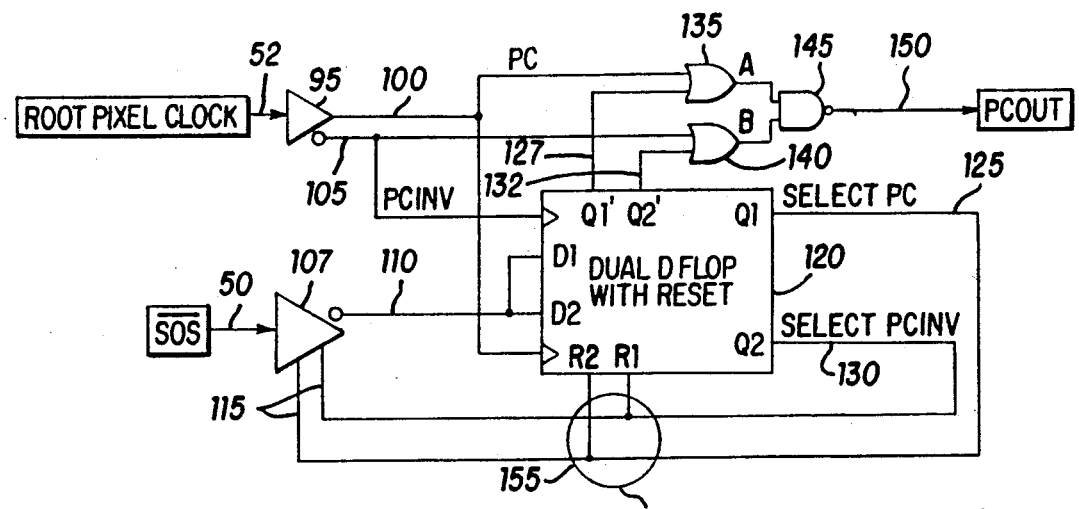
FIG. 3 is a circuit diagram of a pixel clock jitter reduction system which is a preferred embodiment of the present invention.

Now, the hardware circuit, which is the preferred embodiment of the present invention, will be described with reference to FIG. 3. A pixel clock (PC) signal on line 52 and an inverted start of scan ($\overline{SOS}$) signal on line 50 are fed into the circuit. The PC signal on line 52 is fed into an inverter 95 which outputs an inverted pixel clock signal (PCINV) onto line 105 and the unchanged PC signal onto line 100. A second inverter gate 107 takes the $\overline{SOS}$ signal on line 50 and generates a start of scan L 5 signal on line 110 and an unchanged $\overline{SOS}$ signal on line 115.

A dual D flip-flop 120 is fed the signals generated by the inverters 95, 107 and selects either the PC signal or the PCINV signal as the pixel clock signal for the next scanline. The dual D flip-flop 120 has two D flip-flops within it and has two clock inputs, two D inputs and four outputs ($Q_1$, $Q_2$, $Q'_1$, $Q'_2$). The PC line 100 is fed into the clock input of the second D flip-flop within the dual D flip-flop 120. The PCINV line 105 is fed into the clock input of the first flip-flop within the dual flip-flop 120. The SOS line 110 is fed into both D inputs ($D_1$, $D_2$) of the dual flip-flop 120. Thus, when a start of scan signal is generated by the start of scan detector 38, a high digital logic signal is fed into both D inputs of the dual flip-flop 120.

The dual D flip-flop 120 also has a pair of reset inputs that reset each one of the flip-flops within the dual D flip-flop 120 independently of each other. The reset inputs ($R_1$ and $R_2$) of the dual flip-flop 120 are each fed the inverted SOS signal of line 115. In addition, the $R_1$ input is fed a SELECT PCINV signal on line 130 and the $R_2$ input is fed a SELECT PC signal on line 125.

The signals to each of the reset inputs ($R_1$, $R_2$) are "wired-OR" 155 together which is known when in the art using ECL (emitter coupled logic) logic gates.

The "wired OR" 155 is done by simply connecting the two signals together which functions as an OR logic gate. The function of the "wired-OR" 155 will be described below.

The SELECT PC signal on line 125 and the SELECT PCINV signal on line 130 are generated by the dual D flipflop 120 based on the D inputs and clock signals.

The other outputs $Q'_1$ and $Q'_2$ of the dual D flipflop 120 are fed out over lines 127 and 132 respectively and each one is fed into an OR gate 135, 140 respectively which logically ORs the $Q_1'$ and $Q_2'$ outputs with the PC and PCINV signals on lines 100, 105 respectively. The outputs of the OR gates 135, 140 are fed into an AND gate 145 whose output on line 150 is the selected PCOUT signal for the next scanline.

Now, with reference to FIGS. 3 and 4, the operation of the circuit of FIG. 3 will be described. If the $\overline{SOS}$ signal on line 115 is high, the $R_1$, $R_2$ reset inputs of the dual flip-flop 120 are set high which causes both flipflops within the dual flip-flop 120 to be constantly reset until the $\overline{SOS}$ signal is low. When the dual flip-flop 120 is being reset by the $\overline{SOS}$ signal, the SELECT PC and SELECT PCINV signals are both low logic ("0") and the $Q'_1$ and $Q'_2$ outputs are both high ("1"). The high signals on the $Q'_1$ and $Q'_2$ outputs forces the outputs of OR gates 135, 140 high, which in turn forces the output of the AND gate 145, PCOUT, high. Thus, while the $\overline{SOS}$ signal is high (i.e., no SOS signal has been detected), the PCOUT signal on line 150 will be high ("1") regardless of the signals on lines 100 and 105 (PC and PCINV).

To describe the operation of the circuit more clearly, an example, for illustrative purposes only, will be described. In this particular example, the SOS signal will transition from "0" to "1" during the time when PC=1 and PCINV=0. When the SOS signal changes to "1" several events occur. First, the $\overline{SOS}$ signal of line 115 becomes low, which takes the flip-flops of the dual flipflop 120 out of a constant reset state. Second, the SOS signal on line 110 becomes high which places a high signal onto the D inputs ($D_1$, $D_2$) of the flip-flops.

When a high signal is on line 100 (PC=1), it is fed to the clock input of the second flip-flop within the dual flip-flop 120. This signal triggers the second flipflop and causes the high signal to be passed through the D flip-flop and appear as a high signal on output $Q_2$. This signal, called the SELECT PCINV signal, on line 130 is fed back through the "wired OR" 155 and to the $R_1$ reset input of the first flip-flop within the dual flip-flop 120. The high SELECT PCINV signal keeps the first flip-flop of the dual flip-flop 120 reset until another SOS signal is detected. Additionally, since the SELECT PC output is permanently low and the first flip-flop is reset, it keeps the second flip-flop from being reset until a high SOS signal is generated and both flip-flops are reset continually.

The second flip-flop of the dual flip-flop 120 also generates an output $Q_2'$ on line 132 which is the opposite signal (low) from the SELECT PCINV signal (high). The line 132 is attached to an input of the OR gate 140. The other input of the OR gate 140 is attached to the line 105 which has the PCINV signal on it. Thus, the output of the OR gate 140 duplicates the PCINV signal exactly as long as the $Q_2'$ signal on line 132 stays low. This duplicated PCINV signal is fed into one input of the AND gate 145.

The other OR gate 135 generates a constant "1" signal because one of its inputs is connected to the $Q_1'$ on line 127 which is constantly a high signal ("1") since the first flip-flop is being constantly reset (i.e., SELECT PC=0, $Q_1'=1$ until another SOS signal is generated.

The output of the AND gate 145 is a signal which duplicates the PCINV signal and outputs it as the PCOUT signal on line 150. This PCOUT signal is used by the scanner as its pixel clock signal until a new rising edge of a SOS signal is generated by a new scanline.

When the SOS signal on line 50 returns to "1", both flip-flops of the dual flip-flop 120 are once again constantly reset until a high SOS signal is generated again by SOS detector 38.

Similarly, the circuit would select the PC signal on line 100 to be the new pixel clock signal, PCOUT, if the PCINV signal on line 105 was high when the rising edge of the SOS signal on line 110 was fed into the D inputs of the dual flip-flop 120. The circuit selects the signal (PC or PCINV) which is low when the rising edge of the SOS signal is generated.

Figure 4:
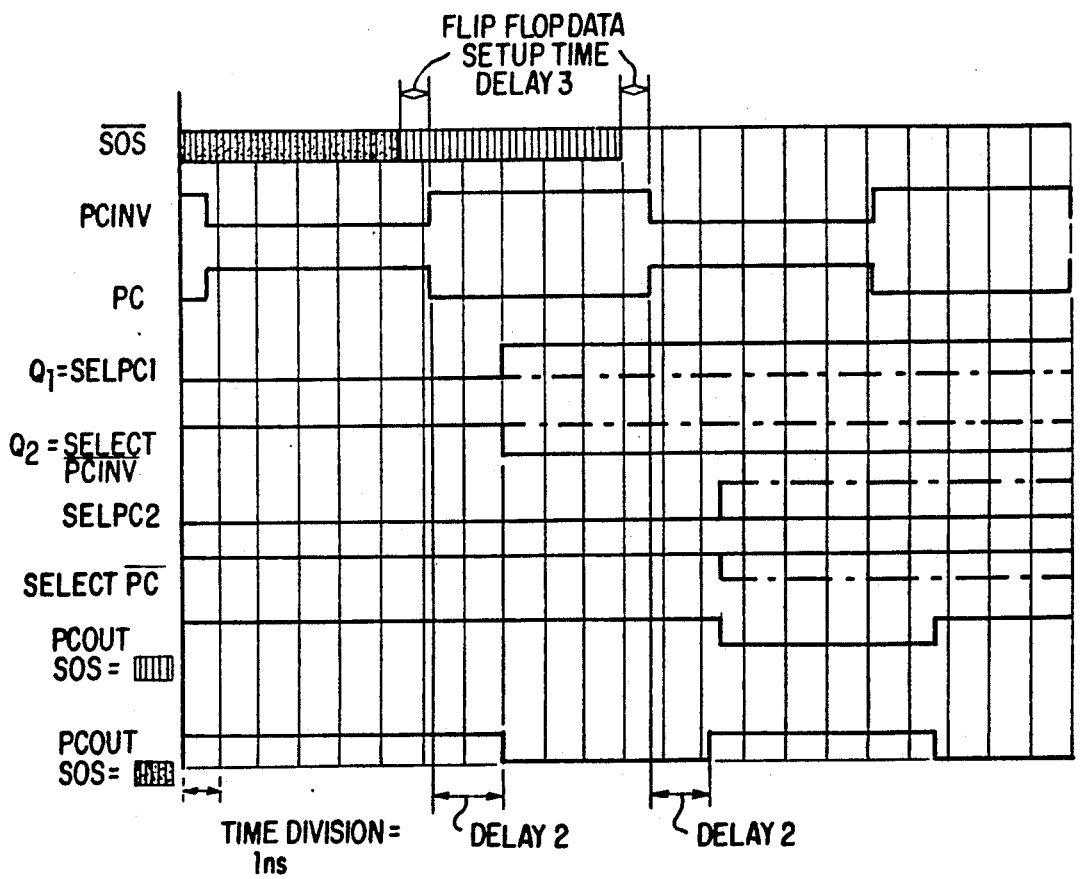
FIG. 4 is a timing diagram showing the operation of the pixel clock jitter reduction system of FIG. 3.

FIG. 4 is a timing diagram showing the operation of the preferred embodiment of the present invention. The SOS signal is shown as a light and dark cross hatching to denote two times when $\overline{SOS}$ will go low, i.e., SOS will go high. The PC and PCINV signals are shown. Each time division in the timing diagram is 1 nanosecond.

The timing diagram incorporates the time delays of the hardware circuitry into the diagram as DELAY 1 and DELAY 2. Delay 1 is the propagation delay from the rising edge of PCINV through elements 120, 135, 140, 145 until PCOUT is enabled. Delay 2 is the propagation delay through elements 135, 140, 145 for PCOUT to change state relative to PC. Delay 2 is constant. Delay 3 is the flip-flop setup time. $\overline{SOS}$ must make its low to high transition sometime prior to Delay 3. If SOS changes from low to high within the Delay 3 period, the circuit may not register the SOS state change. Thus, $\overline{SOS}$ can not change in the region denoted by Delay 3.

While this invention has been described in conjunction with specific embodiments thereof, it is evident that many alternatives, modifications and variations will be apparent to those skilled in the art Accordingly, the preferred embodiments of the invention as set forth herein are intended to be illustrative, not limiting. Various changes may be made without departing from the spirit and scope of the invention as defined in the following claims.

What is claimed is:

1. A method of reducing pixel clock jitter in a raster-scanner wherein a sensor generates a start of scan signal and a crystal oscillator generates a pixel clock signal, comprising the steps of:

generating an inverted pixel clock signal from said pixel clock signal;

generating an inverted start of scan signal from said start of scan signal;

selecting one of said pixel clock signal and said inverted pixel clock signal based on which of said pixel clock signal and said inverted pixel clock signal has a rising edge closest to said start of scan signal, a selected one of said pixel clock signal and said inverted pixel clock signal being a select signal; and replacing said pixel clock signal with the select signal.

2. The method of claim 1, further comprising the step of preventing a subsequent selection of one of said pixel clock signal or said inverted pixel clock signal until detection of a subsequent start of scan signal.

3. An apparatus for reducing pixel clock jitter in a raster scanner wherein a sensor generates a start of scan signal and a crystal oscillator generates a pixel clock signal, comprising:

generating means for generating an inverted pixel clock signal from said pixel clock signal;

generating means for generating an inverted start of scan signal from said start of scan signal;

selecting means for selecting one of said pixel clock signal and said inverted pixel clock signal based on which of said pixel clock signal and said inverted pixel clock signal has a rising edge closest to said start of scan signal, a selected one of said pixel clock signal and said inverted pixel clock signal being a select signal; and replacing means for replacing said pixel clock signal with the select signal.

4. The apparatus of claim 3, further comprising prevention means for preventing a subsequent selection of one of said pixel clock signal or said inverted pixel clock signal until detection of a subsequent start of scan signal.

5. An apparatus for reducing pixel clock jitter in a raster scanner wherein a sensor generates a start of scan signal and a crystal oscillator generates a pixel clock signal, comprising:

an inverting gate for generating an inverted pixel clock signal from said pixel clock signal;

a second inverter gate for generating an inverted start of scan signal from said start of scan signal;

a flip-flop for selecting between said pixel clock signal and said inverted pixel clock signal and outputting a select signal and an inverted select signal; and logic gates for combining said pixel clock signal and said inverted pixel clock signal with said select signal and said inverted select signal to generate an output pixel clock signal.

6. The apparatus of claim 5 wherein said flipflop includes a reset input for resetting said flip-flop based on said select signal, said inverted select signal and said inverted start of scan signal.

* * * * *